United States Patent
Rubin et al.

(10) Patent No.: US 10,477,017 B1
(45) Date of Patent: *Nov. 12, 2019

(54) CALLER FEEDBACK IN MOBILE DEVICES

(71) Applicant: Google LLC, Mountain View, CA (US)

(72) Inventors: Andrew E. Rubin, Portola Valley, CA (US); Wei Huang, Seattle, WA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/744,487

(22) Filed: Jun. 19, 2015

Related U.S. Application Data

(63) Continuation of application No. 13/617,424, filed on Sep. 14, 2012, now Pat. No. 9,071,945, which is a continuation of application No. 11/856,195, filed on Sep. 17, 2007.

(51) Int. Cl.
*H04M 3/42* (2006.01)
*H04M 3/428* (2006.01)
*H04W 4/16* (2009.01)
*H04M 1/60* (2006.01)

(52) U.S. Cl.
CPC ....... *H04M 3/4283* (2013.01); *H04M 1/6041* (2013.01); *H04W 4/16* (2013.01)

(58) Field of Classification Search
CPC .... H04M 1/72572; H04M 19/04; H04M 1/65; H04M 1/72569; H04W 4/021; H04W 4/00; H04W 4/02; H04W 4/12
USPC ........ 455/242.2, 414.2, 413, 73, 550.1, 567, 455/412.2, 416, 414.1, 445, 404.2, 466, 455/569.1; 709/206
See application file for complete search history.

(56) References Cited

U.S. PATENT DOCUMENTS

| | | | |
|---|---|---|---|
| 4,435,622 A * | 3/1984 | Grantland | H04M 3/4283 379/377 |
| 4,440,981 A * | 4/1984 | Grantland | H04M 3/4283 379/393 |
| 5,307,400 A * | 4/1994 | Sawyer | H04W 8/12 455/445 |
| 5,416,780 A * | 5/1995 | Patel | H04M 3/42229 370/347 |
| 5,724,416 A | 3/1998 | Foladare et al. | |
| 6,216,011 B1 | 4/2001 | Wierzbicki et al. | |
| 6,311,078 B1 | 10/2001 | Hardouin | |
| 6,408,177 B1 | 6/2002 | Parikh et al. | |
| 6,577,859 B1 | 6/2003 | Zahavi et al. | |
| 6,597,667 B1 | 7/2003 | Cerna | |
| 6,842,622 B2 | 1/2005 | Peters et al. | |
| 6,941,131 B2 | 9/2005 | Roderique | |
| 7,010,288 B2 | 3/2006 | Brown et al. | |
| 7,069,027 B2 | 6/2006 | Miriyala | |
| 7,119,832 B2 | 10/2006 | Blanco et al. | |

(Continued)

OTHER PUBLICATIONS

Office Action issued in U.S. Appl. No. 11/856,195 dated Jun. 24, 2010, 10 pages.

(Continued)

*Primary Examiner* — Joseph Arevalo
(74) *Attorney, Agent, or Firm* — McDonnell Boehnen Hulbert & Berghoff LLP

(57) ABSTRACT

Caller feedback in mobile devices, in which, upon receiving a telephone call from a caller, a user selection of a control is detected, and a message associated with the selected control is determined and automatically transmitted to the caller.

14 Claims, 10 Drawing Sheets

(56) References Cited

U.S. PATENT DOCUMENTS

| | | | |
|---|---|---|---|
| 7,231,208 B2 | 6/2007 | Robertson et al. | |
| 7,245,941 B2 | 7/2007 | Scott | |
| 7,957,772 B2 * | 6/2011 | Charlier | H04M 1/6066 379/41 |
| 8,446,469 B2 | 5/2013 | Blanco et al. | |
| 9,198,113 B2 * | 11/2015 | Rajeevalochana | H04W 4/027 |
| 2002/0062249 A1 * | 5/2002 | Iannacci | G06Q 20/10 705/14.1 |
| 2003/0016834 A1 | 1/2003 | Blanco et al. | |
| 2003/0105826 A1 * | 6/2003 | Mayraz | G06F 17/30867 709/206 |
| 2003/0119492 A1 * | 6/2003 | Timmins | G06Q 30/02 455/414.1 |
| 2004/0063472 A1 * | 4/2004 | Shimizu | H04M 1/6083 455/569.1 |
| 2004/0176079 A1 * | 9/2004 | Fratti | H04M 1/72513 455/414.1 |
| 2004/0198431 A1 * | 10/2004 | Yamagishi | H04M 1/72522 455/556.1 |
| 2004/0203794 A1 | 10/2004 | Brown et al. | |
| 2005/0282590 A1 | 12/2005 | Hapamas | |
| 2006/0063563 A1 * | 3/2006 | Kaufman | H04M 1/663 455/556.2 |
| 2006/0160562 A1 | 7/2006 | Davis et al. | |
| 2006/0211443 A1 | 9/2006 | Wegman | |
| 2007/0030351 A1 | 2/2007 | Blanco et al. | |
| 2007/0041366 A1 * | 2/2007 | Vugenfirer | H04M 3/561 370/352 |
| 2007/0072619 A1 | 3/2007 | Wei et al. | |
| 2007/0155411 A1 * | 7/2007 | Morrison | H04M 3/493 455/466 |
| 2007/0263798 A1 | 11/2007 | Dewing et al. | |
| 2007/0293159 A1 | 12/2007 | Etelapera | |
| 2008/0056466 A1 * | 3/2008 | Nishimura | H04M 1/642 379/88.22 |
| 2013/0072165 A1 | 5/2013 | Rondeau et al. | |

OTHER PUBLICATIONS

Office Action issued in U.S. Appl. No. 11/856,195 dated Dec. 10, 2010, 16 pages.
Office Action issued in U.S. Appl. No. 11/856,195 dated Apr. 4, 2011, 11 pages.
Office Action issued in U.S. Appl. No. 11/856,195 dated Nov. 9, 2011, 9 pages.
Office Action issued in U.S. Appl. No. 11/856,195 dated May 10, 2012, 13 pages.
Office Action issued in U.S. Appl. No. 11/856,195 dated Mar. 14, 2013, 14 pages.
Office Action issued in U.S. Appl. No. 11/856,195 dated Oct. 17, 2013, 15 pages.
Office Action issued in U.S. Appl. No. 13/617,424 dated Oct. 28, 2013, 19 pages.
Office Action issued in U.S. Appl. No. 13/856,195 dated Dec. 3, 2013, 14 pages.
Office Action issued in U.S. Appl. No. 13/617,424 dated May 16, 2014, 21 pages.
Office Action issued in U.S. Appl. No. 11/856,195 dated Jun. 5, 2014, 18 pages.
Office Action issued in U.S. Appl. No. 13/617,424 dated Oct. 20, 2014, 16 pages.
Notice of Allowance issued in U.S. Appl. No. 13/617,424 dated Feb. 26, 2015, 10 pages.

* cited by examiner

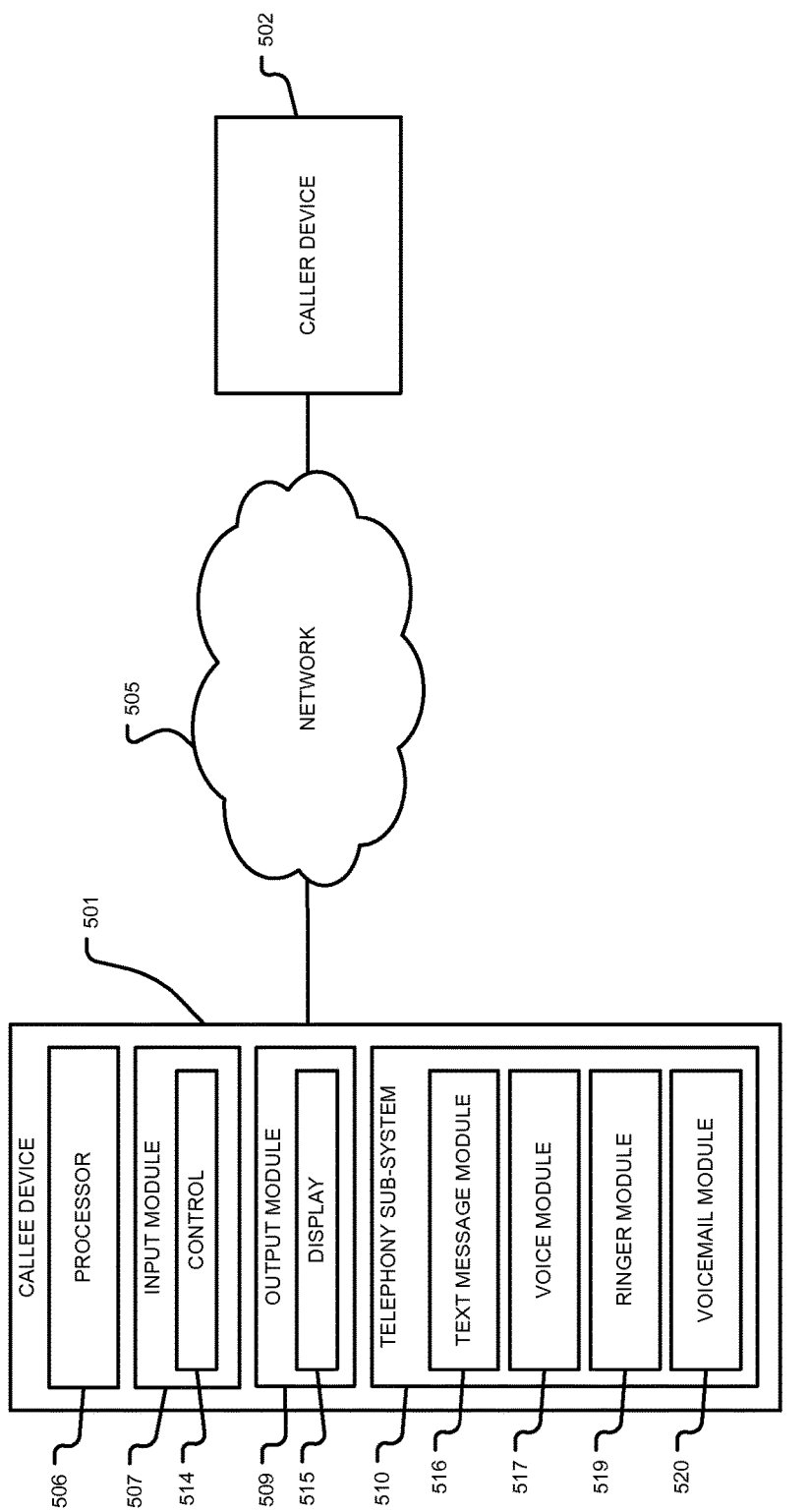

CALLER FEEDBACK IN MOBILE DEVICES

CROSS-REFERENCE TO RELATED APPLICATIONS

This application is a continuation of U.S. patent application Ser. No. 13/617,424, filed on Sep. 14, 2012, which is a continuation of U.S. patent application Ser. No. 11/856,195, filed on Sep. 17, 2007. The contents of both prior applications are incorporated herein by reference in their entirety.

FIELD

The present disclosure generally relates to telephony.

BACKGROUND

Within recent memory, mobile telephones have evolved from a rare curiosity into a widely-available, indispensable business tool and social necessity. Many people have interpreted the rapid penetration and saturation of these products as a general societal advance. As with other supposed conveniences, however, many people also view mobile phones as a nuisance, because they are capable of filling otherwise serene locales or moments of quiet reflection with annoying rings and inane conversation.

Typically, a mobile phone rings, flashes lights, or vibrates to alert a callee of the existence of an incoming telephone call. Faced with a ringing mobile phone, the callee generally may select a button to accept the call, may allow the call ring through to voicemail, or may select another button that sends the call through to voicemail without ringing through. If the callee is in a meeting and cannot accept the call, however, they often may choose to manually send the call through to voicemail without ringing through, in order to quickly silence the ringing telephone.

The caller can often detect that the callee has manually sent their call through to voicemail if fewer than a customary number of rings, such as four rings, occurs before the call is connected to voicemail. In these circumstances, the caller may wrongly presume that the callee is rudely screening their telephone call. In myriad social and business contexts, the caller may take umbrage at this supposed personal slight, potentially leading to loss of business opportunities and diminishment of the callee's social stature.

SUMMARY

A user of a mobile device such as a cellular telephone may provide graceful feedback to a caller that the user is temporarily unavailable by providing a command to his or her device. Use of this command may cause the device to send a predefined message, or a message that the user discretely generates on the spot, to the caller, indicating that the call is important to the user and will be returned. Alternatively, the message may inform the caller that the user needs a few moments before they are able to speak, and places the device in a mode such that the call is accepted but the caller does not hear the user until the user is ready and able to speak. For example, the device may be muted to allow a user to accept a telephone call in a loud nightclub, while transmitting a context-providing message to the caller that the user is retreating to a quieter spot to initiate conversation. Other forms of feedback and handling of a call may also be provided.

According to one general implementation, a selection of a control is detected upon receiving a telephone call from a caller. A message associated with the selected control is determined and automatically transmitted to the caller.

Implementations may include one or more of the following features. For example, the control may be a physical button or an on-screen control. The method may further include accepting the telephone call, terminating the telephone call, or activating a stand-by mode based upon detecting the selection. In the stand-by, a telephone ringer may be set to 'off' or 'vibrate,' the telephone call may be directed to voicemail or a hold state, or a device receiving the telephone call may be powered off. The method may also include muting a microphone, detecting a second selection of the control, and un-muting the microphone based on detecting the second selection.

In further examples, the telephone call is accepted or terminated before or after transmitting the determined message. Before receiving the telephone call, the control may implement a first function and, upon receiving the telephone call, the control may implement a second function associated with transmitting the determined message. The message may be a short messaging service (SMS) message or a voice message. A messaging modality may be determined from a modality hierarchy associated with the caller, where the determined message may be transmitted to the caller via the messaging modality.

Additionally, the message may be indicative that a callee is temporarily unavailable, and may be further indicative of a time increment for which the callee is unavailable. A user interface including the control may be generated. The selection may be a manual selection by a callee or an automatic selection. Detecting the selection of the control may further include detecting a selection of the control while a device is ringing. Voice data may be recorded as the message based on detecting the selection of the control.

According to another general implementation, a computer program product is tangibly embodied in a machine-readable medium. The computer program product includes instructions that, when read by a machine, operate to cause a data processing apparatus to detect, upon receiving a telephone call from a caller, a user selection of a control. The computer program product further includes instructions that cause the data processing apparatus to determine a message associated with the selected control and automatically transmit the determined message to the caller.

According to another general implementation, a device includes an input module to detect, upon receiving a telephone call from a caller, a user selection of a control. The device further includes a processor to determine a message associated with the selected control, and a telephony module to automatically transmit the determined message to the caller.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 5 is a block diagram of an exemplary system.

Like reference numbers represent corresponding components throughout.

DETAILED DESCRIPTION

Generally, a caller (or 'call originator,' 'calling party,' or 'A-party') is a person that initiates a telephone call, for example by dialing a telephone number. Conversely, a callee (or 'call recipient' or 'called party') is a person or device that receives a telephone call.

Telephone calls are generally placed through one or more networks, such as a Public Switched Telephone Network (PSTN) provided by one or more traditional commercial telephone company or by a cellular network of base stations provided by a commercial mobile telephone company, as extended in various ways, such as by the Internet, private cellular telephone networks, and other such networks. A telephone call is initiated when a caller dials or otherwise transmits a telephone number or other unique identifier of the callee. Through various mechanisms, the network receives the unique identifier of the callee, and generates the telephone call.

The telephone call is received when the callee is alerted of the incoming call, where the alert provides a user with the opportunity to answer or otherwise accept the telephone call. A telephone call is still received by the callee, even if the callee elects to not answer or otherwise accept the telephone call. Acceptance of a telephone call may occur by selecting an 'accept call' button or, if the telephone has a clamshell design, by opening the telephone. Acceptance may occur by other mechanisms, such as by a proximity sensor and/or accelerometer that determine when a user has moved a device up to their ear, or from a user speaking a command into a microphone. When the call is accepted, a microphone and a speaker on the telephone activate to allow sounds to be transmitted between the caller and the callee.

Figure 1:
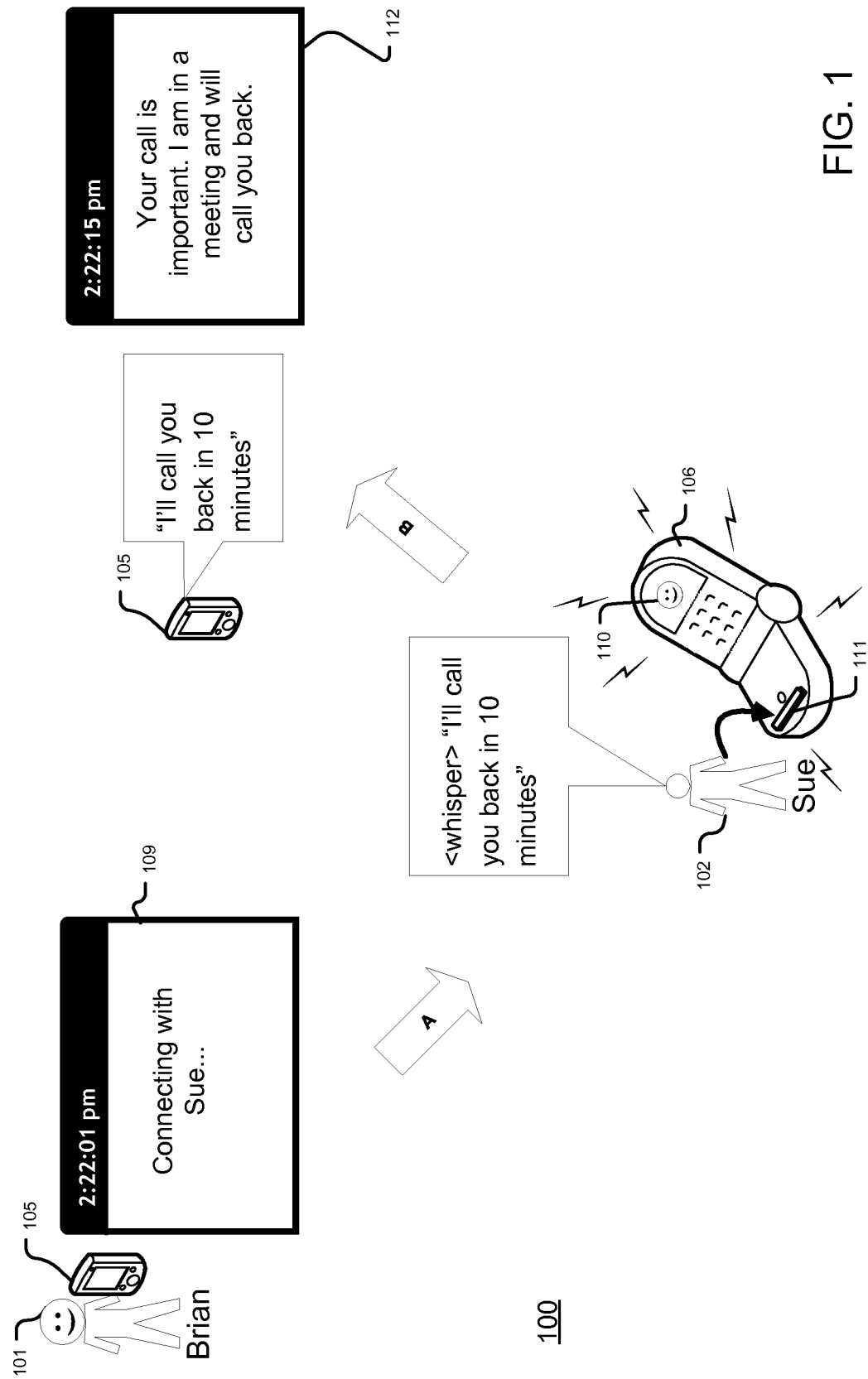
FIG. 1 is a conceptual diagram of a system for providing graceful caller feedback.

FIG. 1 is a conceptual diagram of a system 100 for providing graceful caller feedback. In particular, FIG. 1 illustrates communication between a caller 101 ("Brian") and a callee 102 ("Sue"), in various states. Using a personal digital assistant 105 that includes telephone or telephony capabilities, Brian dials Sue's mobile phone 106 at 2:22:01 pm. A user interface 109 on Brian's personal digital assistant 105 reflects the time and status of the outgoing or initiated telephone call.

A few seconds later, after the telephone network (which may include the traditional telephone network, private cellular networks, and/or data networks such as the internet) processes the telephone number data transmitted by Brian, Sue's mobile phone 106 rings upon receiving the telephone call (i.e. immediately or very soon after receiving the telephone call, or on the occasion of receiving the telephone call). For the purposes of this example, it is assumed that Sue is unwilling or unable to accept Brian's call within a short period of time. For example, Sue may be in an important meeting, may be driving, may be entering a mobile phone 'dead zone', may be speaking to an important client on another telephone line, or may simply be mentally focused on a critical project.

When the telephone call is received at the mobile phone 106, caller information 110, such as a telephone number, picture, or profile information of the caller is displayed if available. For example, the network or carrier that the mobile phone 106 operates on may provide a caller identification ("caller ID" or automated number identification (ANI)) service that provides the telephone number and/or other data identifying the caller. Using this information, the mobile phone 106 may access and display other caller information that may be stored on the mobile phone 106. In FIG. 1, for example, the caller information 110 displayed on the mobile phone 106 includes a picture of Brian.

Sue, who in this example is in a meeting and cannot be disturbed, touches caller feedback control 111 on the mobile phone 106. Caller feedback control 111 is a physical button, such as a keypad button, an on-screen virtual button control, or a "soft" button. By selecting the caller feedback control 111, Sue is able to immediately silence the ringer on the mobile phone 106 as well as transmit a message to Brian that his call is important and will be returned. For example, Sue may type a textual response that will be sent back to Brian, such as in the form of a text message. The text message may also be generated automatically, such as a previously identified message that Sue has prepared for similar calling situations.

Mindful that her meeting will end in five minutes and that Brian is an important client, Sue may also want to send him a discreet, customized voice message. Accordingly, while holding down the control 111, Sue whispers a voice message stating "I'll call you back in 10 minutes" into the mobile phone 106. Recording a short voice message on-the-fly is more personal and immediate, and takes less time to generate than typing a text message. A 'voice message' is a pre-stored or dynamically recorded message that is sent by the callee to the caller. For instance, when the telephone call has been accepted but the speaker is muted on the callee's side, the callee can send a stored voice message across the active line.

If the control 111 is a physical button, Sue has the ability to select the control on the basis of feel, for example while the mobile phone 106 is ringing in her pocket or purse, allowing her to quickly silence the ringer and provide feedback to Brian without fumbling or otherwise requiring her undue attention. Similar touch-based activation may occur, for example, where the mobile phone 106 is provided with an accelerometer, and shaking or jerking of the mobile phone 106 can indicate that the user wishes to invoke graceful caller feedback.

On selecting the control 111, the mobile phone 106 determines a message to send to Brian. In this example, the control 111 is associated with the predefined text message "YOUR CALL IS IMPORTANT. I AM IN A MEETING AND WILL CALL YOU RIGHT BACK." As such, the mobile phone 106 sends the predefined text message via SMS, multimedia messaging service (MMS), e-mail, or any other mechanism to the personal digital assistant 105. Furthermore, the mobile phone 106 accepts the telephone call, mutes the microphone and speaker on the mobile phone 106, transmits the voice message over the telephone network, and disconnects the telephone call.

A user interface 112 on the personal digital assistant 105 displays the predefined text message to Brian, and the personal digital assistant outputs the voice message, at time 2:22:15 pm. Thus, even though Sue rejected Brian's call, Brian is provided with feedback that is graceful, timely and personal. Such feedback reduces the likelihood that Brian will be offended at the rejection of his call.

In various configurations, or based on data-sharing settings, the details of the message may by automatically or dynamically selected or modified. For example, if Brian were a stranger or untrusted acquaintance to Sue, the mobile phone 106 may send a more generally message, such as "CALL AGAIN LATER PLEASE." Such an automatic and dynamic determination approach allows the callee to simply select a control to silence the phone, while allowing the mobile phone to select the appropriate message to send as feedback, based on various settings and profile information. Such a determination about the identity of the caller may be made using data such as ANI data received with the call, which may then be compared to a contacts database for the user, such as a database that identifies levels of security to be applied to particular contacts (e.g., by labeling contacts as business contacts, friends, relatives, etc.).

Although Brian may be able to detect that Sue has not rejected his call, Sue's whispered voice message and the accompanying text message will prevent Brian from incorrectly presuming that his call has been rudely screened. While typical call rejection may provide abrupt feedback, because no context or reasons for the rejection are presented to the caller, 'graceful' caller feedback may be characterized by the transmission of a message or messages that in certain implementations may place the reasons for the call rejection into context, tactfully explaining or presenting information that appeals to the callers sense of importance and dignity. By transmitting predefined messages, graceful feedback can occur via the selection of a single control, thereby obviating the need for the user to manually enter complicated and time consuming text messages.

As noted above, the feedback may take a variety of forms or combinations of forms. For example, the feedback may be a pre-typed or prerecorded message. Such message may be provide to a caller as the only available feedback message, as an automatically-selected message (e.g., using the social status of the caller relative to the callee), or as manually-selected by the callee (e.g., from a menu of messages displayed to the callee while the call is incoming). Also, the feedback may take the form of information entered by the callee in real time while the call is incoming. As discussed above, such information may include a typed or spoken message or a combination of the two.

Figure 2:
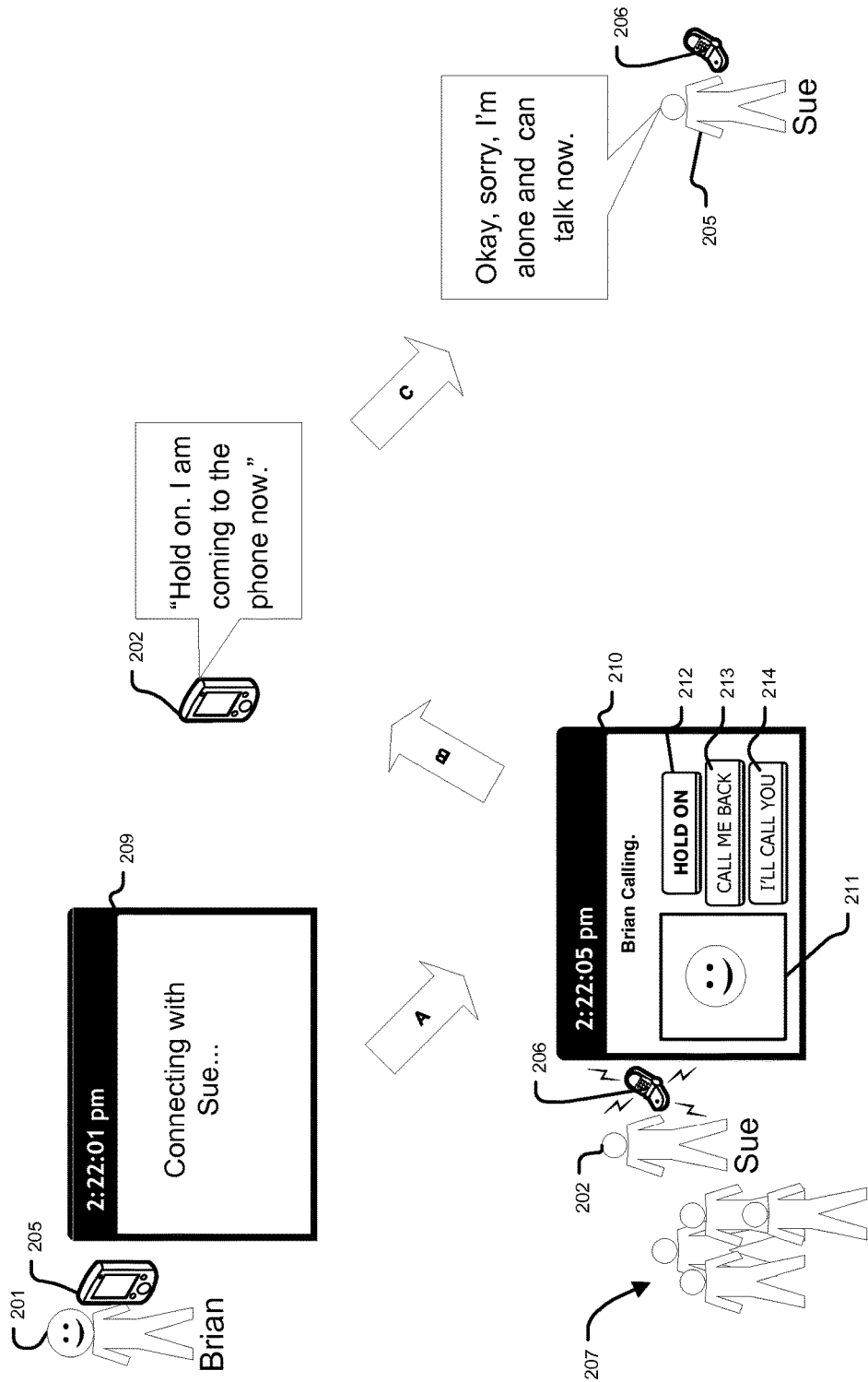
FIG. 2 is a conceptual diagram of another system for providing graceful caller feedback

FIG. 2 is a conceptual diagram of a system 200 for providing graceful caller feedback. Similar to FIG. 1, FIG. 2 illustrates communication between a caller 201 (again, "Brian") and a callee 202 (again, "Sue"), in various states. Using a personal digital assistant 205 that includes telephone or telephony capabilities, Brian dials Sue's mobile phone 206 at 2:22:01 pm. A user interface 209 on Brian's personal digital assistant 205 reflects the time and status of the outgoing or initiated telephone call.

For the purposes of this example, it is assumed that Sue is temporarily unwilling or unable to speak with Brian, but would be able to speak if she had a few seconds to retreat to a more appropriate location or compose herself for the conversation. For instance, Sue may not wish for a nearby crowd of people 207 to overhear her conversation, or she may be in a noisy nightclub or in an elevator when the mobile device 206 begins to ring. Furthermore, Sue may be driving in a jurisdiction that does not allow for people to speak on mobile phones when driving, and may want to have a few moments to pull over her vehicle before carrying on a conversation.

In each of these situations, however, and unlike FIG. 1, Sue would be able to speak if she had a few moments to retreat to a quieter location, or wait for a temporary situation to pass. Without the ability provide graceful caller feedback, Brian's call may inadvertently be passed to voicemail, or Brian may hang up before Sue answers the telephone call. Answering the mobile phone 206 too quickly, however, could cause Brian to hear sensitive discussions from the meeting that Sue is retreating from, or rudely blast Brian with loud sounds or music that are nearby to Sue when the telephone call is initially received.

After the telephone network processes the telephone number data transmitted by Brian, Sue's mobile phone 206 rings upon receiving the telephone call (i.e. immediately or very soon after receiving the telephone call, or on the occasion of receiving the telephone call). When the telephone call is received, a user interface 210 is generated on the mobile phone 206. The user interface includes caller information 210, which in this case is a picture of Brian, as well as caller feedback controls 212 to 214, which are respectively associated with the predefined text message "HOLD ON. I AM COMING TO THE PHONE NOW," "CALL ME BACK IN 10 MINUTES," and "I WILL CALL YOU BACK SHORTLY."

Sue, who is in a meeting and cannot be disturbed, touches caller feedback control 212 on the mobile phone 206. By selecting the caller feedback control 212, Sue is able to silence the ringer on the mobile phone 206 as well as transmit a message to Brian that she is on her way to answering the call.

On selecting the control 212, the mobile phone 206 determines a message to send to Brian. In this case, the mobile phone 206 checks Brian's caller profile, and determines using a modality hierarchy that, because Brian has poor eyesight, voice messages have a higher priority than text messages. A text-to-speech converter converts the text message to a voice message. As such, the mobile phone 206 accepts the telephone call, mutes the microphone and speaker on the mobile phone 206, and transmits the voice message over the phone network. If Brian had poor hearing, the mobile phone 206 might have transmitted a text message instead of a voice message.

When Sue is able to speak, she selects the control 212 again, which un-mutes the microphone and speaker, and the call proceeds normally. For example, Sue may select the control 212 when she gets off an elevator at her destination, when she leaves a meeting, or moves away from a noise source. In any case, by transmitting predefined message telling Brian to hold for a few moments, Sue no longer has to reject Brian's call outright in order to avoid the risks associated with prematurely accepting his call. Furthermore, Brian is happy, because his call has not been rejected, and he may assume that Sue made an effort to allow the call to happen.

Furthermore, upon being opened or otherwise interacted with, the mobile phone 206 (or the telephone network) can initiate a return telephone call to Brian. In a further implementation, the mobile phone 206 includes at least a first control which places a telephone call on hold for a short period of time if selected, and a second control which notifies the caller that a more extended period of time will transpire before the call is returned. Each control may cause the phone to transmit a different message or initiate a different behavior by the mobile phone 206.

Figure 3:
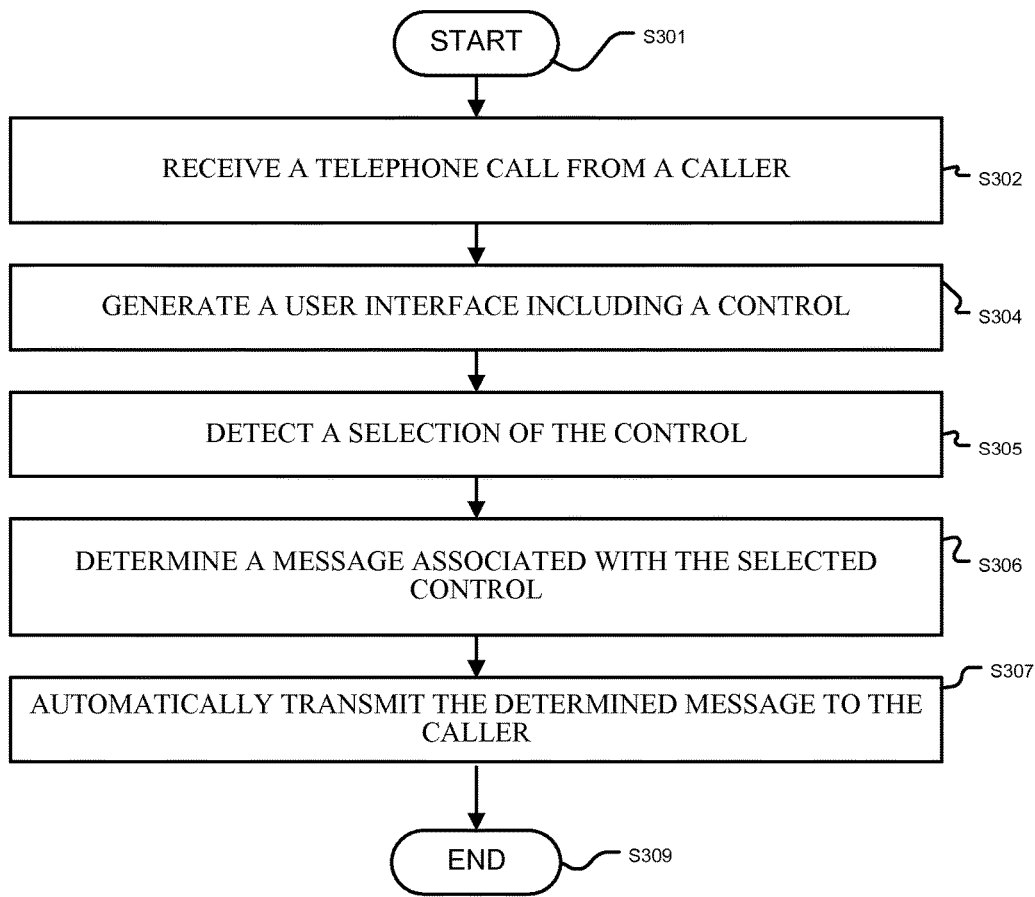
FIG. 3 is a flowchart illustrating an exemplary process.

FIG. 3 is a flowchart illustrating an exemplary process 300 for providing graceful caller feedback. Briefly, the process 300 includes detecting, upon receiving a telephone call from a caller, a user selection of a control, determining a message associated with the selected control, and automatically transmitting the determined message to the caller.

In more detail, the process 300 begins (S301) when a telephone call is received from a caller (S302) and a user interface including the control is generated (S304). For example, the user interface 210, which includes controls 212, 213 and 214, is generated on the mobile device 206 upon receiving the telephone call from the caller 201. In another example configuration, such as where the control is a physical button, the user interface is not generated.

The control may also be a "soft" physical button located adjacent to the display whose selection has different effects based upon software settings. In this case, a user interface is generated upon receiving the call to provide a visual context to the soft button, by providing a label that is physically adjacent to the soft button. By providing soft buttons to provide graceful caller feedback, it may be relatively easier to alter the messages associated with each respective button, because a physical button may also be physically labeled with (and may thus be permanently constrained by) an identified message.

A selection of the control is detected (S305). The selection of the control may be detected, for example when a physical button or an on-screen button on a device receiving the telephone call is selected, pressed, or otherwise interacted with by the callee. When the ringer on the device alerts the callee to the incoming telephone call, the callee may not be willing or able to accept the telephone call. Accordingly, the callee may select a control to silence the ringer and provide graceful feedback to the caller.

The control may be selected before the device begins to ring, while the device is ringing, after the device has ceased ringing, or while communicating on an accepted or answered telephone call. For instance, if the callee is already talking on an important call when a second caller initiates a telephone call, the callee may select the control from a 'call waiting' user interface. In this case, a message may be sent by placing the first caller on hold, switching to the telephone call of the second caller, transmitting the message to the second caller, placing the second caller on hold, and switching back to the telephone call of the first caller.

A message associated with the selected control is determined (S306). The selection of the control, or each selection of the control, can affect the message that is sent to the caller as feedback. Therefore, by associating a message with the control, the callee may choose a control to select, or choose a number of times to select the control, based upon the information that they want to share with the caller. As such, the user may choose a different control to select, or may select a control a greater number of times, to quickly modify or scroll through messages that could be sent as feedback.

The message may be output as a signal from the control itself, or the processor may query a look-up table or other database to determine the appropriate message associated with the control, based on any number of conditions. Furthermore, where a button is physically labeled with one particular message that may not be changed by the user, the message is determined when the single message associated with that button is accessed by a processor.

In one example, the callee may not be able to speak with the caller because the callee is stuck in a meeting. When deciding which message they should send as feedback to the caller, the callee take many factors into account, such as the present time, the scheduled meeting end time, the personality of the people who are attending the meeting, their desire to receive an interruption, the importance of the caller, the specific predetermined messages available to be sent, and other factors. In another example, where the callee's mobile phone is ringing during a meeting or other important conversation, the user may select the control one time just to silence the device, knowing that a one-time selection of the control transmits a tactful but general message, such as "YOUR CALL IS IMPORTANT. I WILL CALL YOU BACK SHORTLY."

In one example configuration, each selection of the physical button may be associated with a scrolling operation to increase a time increment associated with the messages, such that the first selection of the control transmits "I'LL CALL YOU BACK," the second selection of the control transmits "I'LL CALL YOU BACK IN FIVE MINUTES," the third selection of the control transmits "I'LL CALL YOU BACK IN TEN MINUTES," et cetera.

In another example configuration, the time increment associated with a message may be dynamically controlled, either automatically or by a user selection. For instance, the user can type the number '9' into a keypad and then select the control, thereby transmitting a message indicating that the callee will call back in nine minutes. Alternatively, the number '9' may be indicative of a level '9' call importance or priority, or a type '9' message, which may tailor or select the message that is determined. In this regard, different importance or priority levels, or message types may be predefined for easy and quick selection by the user In a further example configuration, the user may select a setup option to associate different messages with different soft keys. For example, the user can assign "I'LL CALL YOU TOMORROW" message, a "I'M NOT INTERESTED—PLEASE DON'T CALL ME AGAIN" message, a "I'LL CALL YOU RIGHT BACK" message, and an "I'M DRIVING THROUGH A CELLULAR DEAD-SPOT—HANG ON" message to four different soft keys.

Any of these approaches or other approaches for statically or dynamically, manually or automatically associating a message or time increment with a control, may be used. Additionally, as in the case where the caller is a telemarketer, the message need not be graceful, and in fact may be intentionally abrupt. It is not necessary that the device receiving the telephone call be capable of transmitting more than one message, or altering or dynamically modifying messages.

The determined message is automatically transmitted to the caller (S307), thereby ending the process 300 (S309). By sending the message to the caller, the caller receives an indication that the callee is temporarily unable to receive a telephone call, and provides some context to the reason for the unavailability or indication of when the callee will again be available.

Figure 4:
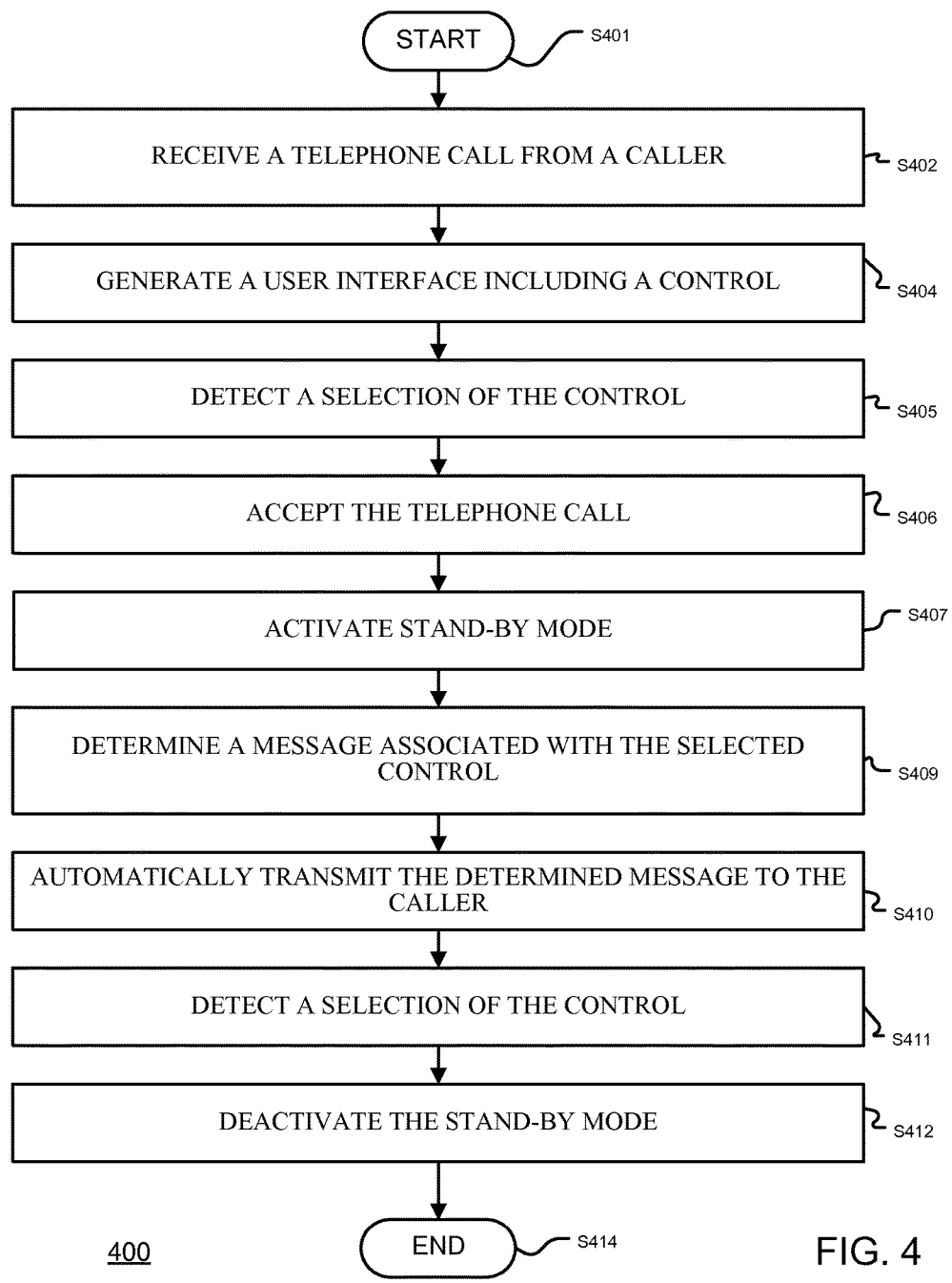
FIG. 4 is a flowchart illustrating another exemplary process.

FIG. 4 is a flowchart illustrating another exemplary process 400 for providing graceful caller feedback. Briefly, the process 400 includes detecting, upon receiving a telephone call from a caller, a user selection of a control, determining a message associated with the selected control, and automatically transmitting the determined message to the caller.

In more detail, process 400 begins (S401) when, upon receiving a telephone call (S402), a user interface including the control is generated (S404). When the control is a physical button, the user interface is not generated, or a user interface may be generated that does not include the control, for example to provide a label to a soft button.

A selection of the control is detected (S405). When the ringer on the device that receives the telephone call alerts the callee to the incoming telephone call, the callee may be not be available to immediately speak with the caller. Accordingly, the control may be selected to silence the ringer as well as to provide the caller with feedback that the caller will be able to speak momentarily. If the control is an on-screen control, the callee selects the control by touching his or her finger or using another pointing device to select a portion of a touch screen display defined by the control.

The telephone call is accepted (S406) and a stand-by mode is activated (S407), or vice versa. In the stand-by mode, a behavior of the device receiving the telephone call is changes. The changed behaviors may be preset, or set or selected by the user. For example, a microphone and/or a speaker may be muted until a second selection of the control (or a selection of a different control) is detected. By muting the microphone, the caller does not hear the ambient sounds near the device, such as the sounds of the callee leaving a meeting or nightclub, or fumbling with the device while activating a hands-free kit. In further configurations, the stand-by mode sets a telephone ringer to 'off' or 'vibrate,' the telephone call is directed to voicemail or a hold state, or the device receiving the telephone call is powered off. In another example implementation, the telephone call is accepted after the stand-by mode is activated.

In addition to indicating that the user is currently unable to answer the call, the control may also enter a stand-by mode if the user needs a few seconds to answer the telephone call, such as when the callee is rushing out of a conference room to a quieter or more private location. In the stand-by mode, the microphone may be muted and a predetermined message may be transmitted, such as a voice or text message that states "HANG ON . . . I'LL BE ABLE TO TALK IN A FEW SECONDS." The stand-by mode may be deactivated when the user retreats to a private location where they can speak and presses a control, thereby un-muting the microphone.

A message associated with the selected control is determined (S409). The selection of the control, or each selection of the control, affects the message that is sent to the caller as feedback. Therefore, by associating a message with the control, the callee may choose a control to select, or choose a number of times to select the control, based upon the information that they want to share with the caller. As such, the user may choose a different control to select, or may select a control a greater number of times, to quickly modify or scroll through messages that could be sent as feedback.

The message may be indicative that a callee is temporarily unavailable, and may be further indicative of a time increment for which the callee is unavailable. In one example, the callee may not be able to speak with the caller because they are driving in a jurisdiction that does not allow a driver to speak on a mobile phone. In this regard, the callee may simply select a physical button associated with an "I AM DRIVING. PLEASE HOLD." message.

The message does not need to be predetermined, and may be created on-the-fly, such as based on the selection of the control. For instance, when the user selects the control (or another control associated with a dynamic message creation function) to begin and end recording a voice message (such as "I'M IN AN ELEVATOR—HOLD ON A SEC'") using a microphone, an image or video (of, for example, a nightclub, a car steering wheel, or an elevator cab) using a camera. This dynamically recorded data may be transmitted instead of or in addition to the predetermined text message, and may be used to provide additional context to or verify the veracity of the text message.

The message may be any type of message, such as a voice message or an SMS message. The message may be predefined, such as text message that indicates "I AM IN A MEETING AND WILL CALL YOU RIGHT BACK" or the meeting may be dynamically created, such as by whispering the same message into a microphone while the phone is ringing and the control is selected.

The determined message is automatically transmitted to the user (S410). The message can be transmitted once, or it may be transmitted or looped multiple times while the caller is retreating to an appropriate location. This message includes an indication that the caller is unable to immediately communicate on the call, but will be able to speak in a short period of time if the caller chooses to remain on the line. At any time while the message is being output to the caller, the caller or callee may choose to terminate the telephone call without speaking.

Before sending the message to the caller device, the callee device may determine which modality of the caller device should be used. For instance, if the caller device only includes a voice modality, the caller device may convert a predetermined text message to a voice message using a text-to-speech module, and transmit the voice message to the caller device. Alternatively, if the caller device includes multi-modal capabilities, the caller device may transmit one or more of a text message, a voice message, and a video message based upon bandwidth, manufacturer preset settings, user selectable settings, caller profile information, or detected caller device capability information. These bases generally define a modality hierarchy that describes the propriety and order of multi-modal message transmission.

The callee again selects the control (or selects a different control) when they are willing and able to speak with the caller. When the control is detected (S411), the stand-by mode is deactivated (S412) and the process 400 ends (S414). Upon deactivating the stand-by mode, the caller and callee may converse normally. The stand-by mode may also be automatically deactivated, for example after a predetermined amount of time passes, when a noise level reduces to below a particular threshold, or a position detector determines that the callee has stopped moving or has reached a particular location.

FIG. 5 is a block diagram of an exemplary system 200 that is used to provide graceful caller feedback. The system 500 includes a callee device 501 and a caller device 502 connected by way of a network 505. The callee device 501 and the caller device 502 include telephonic capabilities.

Among other components, the callee device 501 includes a processor 506 for processing computer instructions; an input module 507 for receiving input from a user; an output module 509 for generating output to the user; and a telephony subsystem for provide voice or data communication by connecting the device 501 to other telephonic devices (such as caller device 502) over the network 505.

In further detail, the input module 507 includes, receives input from, and/or generates at least one control 514, such as a physical button, on-screen control, or an accelerometer-based input, that is capable of being automatically or manually selected. Among other components, the output module 509 includes a display 515, which may also function as a touch screen for the input module 507. The telephony sub-system further includes a text message module 516 that enables the device 501 to send and receive text or SMS messages; a voice module 517 that enables the device 501 to communicate voice data; a ringer module 519 that alerts the user of the device 501 to incoming telephone calls through audio, visual, or tactile outputs; and a voicemail module 520 that enables the device 501 to interact with and route incoming telephone calls to a carrier-provided voicemail system.

Although further description of the caller device 502 is omitted for the sake of brevity, in many cases this device will have similar components as the callee device 501, such as a processor, an input module, and an output module. In the cases where these devices are the same type of device, compatibility is assured, allowing communication between these devices to be deemed more reliable, and further permitting more enhanced functions to be provided or enabled.

Figure 6A:
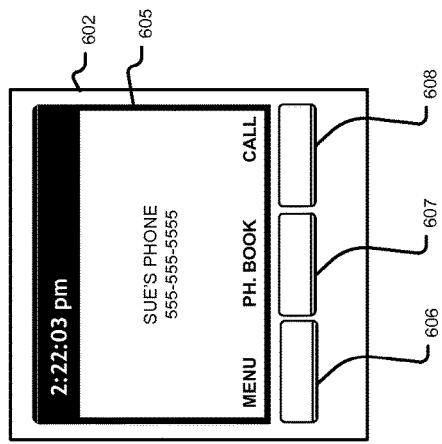
FIGS. 6A and 6B depict a portion of an exemplary device surrounding a display, in a state just before receiving a telephone call and upon receiving the telephone call, respectively.

FIG. 6A depicts a portion of a mobile phone 602 surrounding a display 605, in a state just before receiving a telephone call. The mobile phone 602 includes soft buttons 606 to 608, whose function is determined based on a state of the software executing on the mobile phone 602. For instance, before receiving the call, the display 605 displays MENU adjacent to soft button 606, PH. BOOK adjacent to soft button 607, and CALL adjacent to soft button 608. In this state, a selection of soft buttons 606 to 608 would implement a menu function, a phone book function, and a telephone call function, respectively.

Figure 6B:
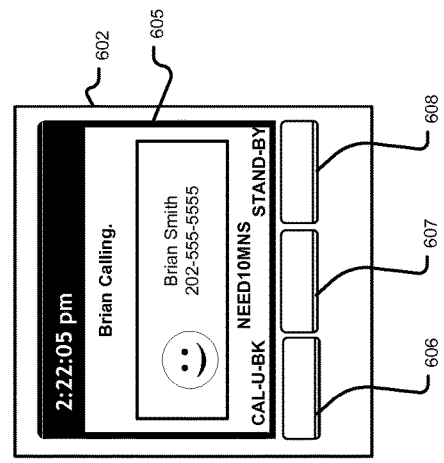

FIG. 6B depicts a portion of the mobile phone 602 surrounding the display 605, upon receiving the telephone call. In this state, the display 605 displays CAL-U-BK (associated with the text message "I WILL CALL YOU BACK") adjacent to soft button 606, NEED10MNS (associated with the text message ("I NEED TEN MINUTES. CAN YOU KINDLY CALL ME BACK THEN?") adjacent to soft button 607, and STAND-BY (associated with the activation of the stand-by mode) adjacent to soft button 608. A selection of soft buttons 606 and 607 would result in the transmission of the associated text messages, and a selection of the soft button 608 would result in the mobile phone 602 entering stand-by mode.

While the telephone call is being received, for example when the mobile phone 602 is ringing, the selection of the soft button 606 would not activate a phone book function, but would rather cause the text message I WILL CALL YOU BACK to be transmitted to the caller. Thus, before receiving the telephone call, the control may implement a first function, and, upon receiving the telephone call, the control may implement a second function associated with providing graceful caller feedback.

Similar to the selection of a multi-function "soft" physical button, the control may be a physical button that has an commonly ascribed function at times other than during the reception of a telephone call, and a function associated with providing graceful caller feedback upon receiving the telephone call. Upon receiving an incoming telephone call, for example, the SPACEBAR key may be associated with providing graceful caller feedback instead of the commonly ascribed function of outputting a space character.

Because the SPACEBAR key, the ENTER key, or the SHIFT keys are physically larger than most other keys, and have a unique shape, they would be easier for a user to locate and press quickly, primarily using their sense of feel. The same may be true of buttons provided on the outside of a device, such as on the device's edges or front face. In doing so, the appropriate control could be selected without actually looking at or examining the device, allowing the control to be selected while the user is in the dark, or while the device is within a bag or item of clothing.

Figure 7:
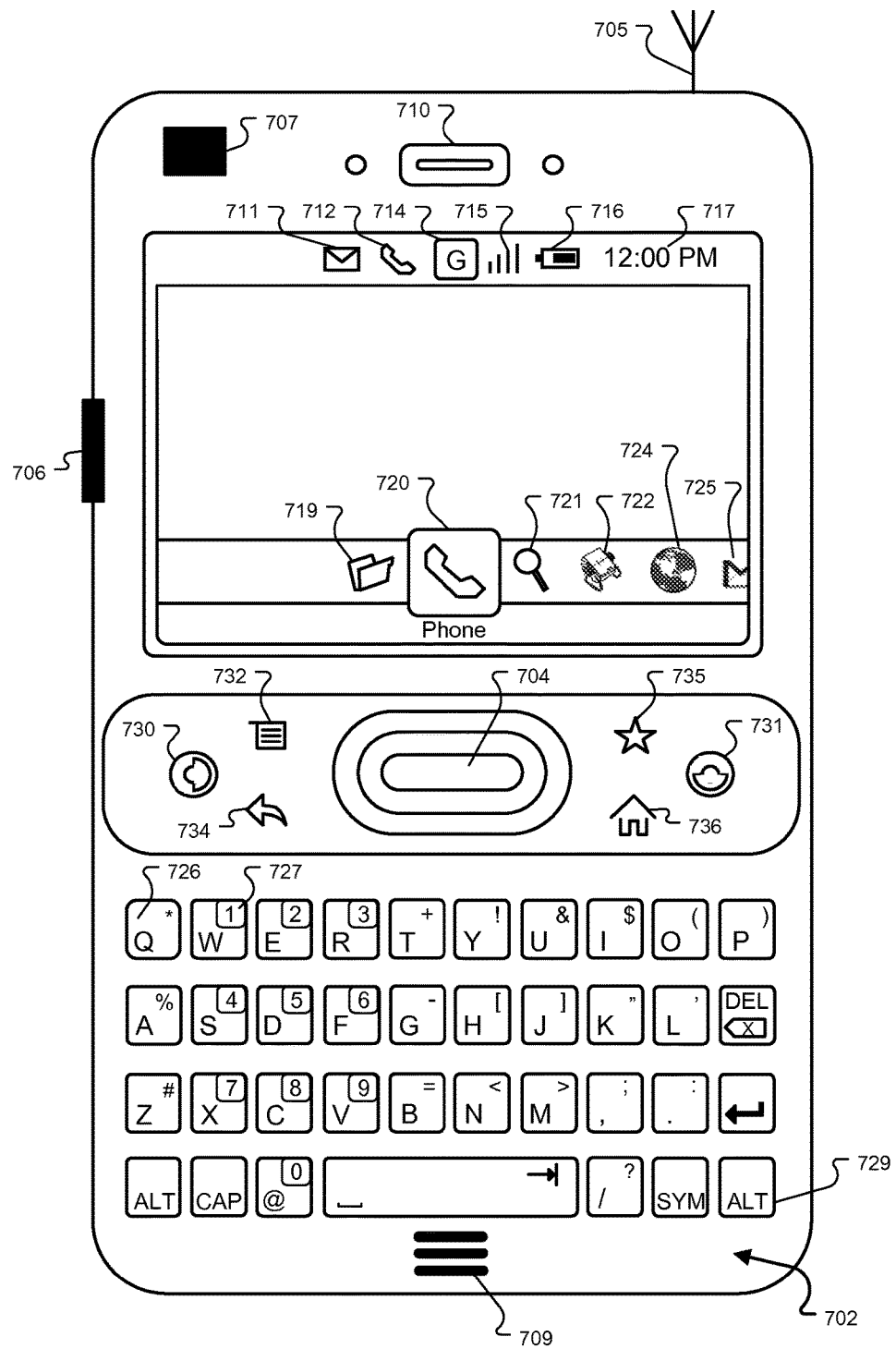
FIG. 7 is a schematic representation of an exemplary mobile device that implements embodiments of the call handling described herein.

Referring now to FIG. 7, the exterior appearance of an exemplary device 700 that implements the various features described above is illustrated. Briefly, and among other things, the device 700 includes a processor or processors to detect, upon receiving a telephone call from a caller, a user selection of a control, determine a message associated with the selected control, and automatically transmit the determined message to the caller.

In more detail, the hardware environment of the device 700 includes a display 701 for displaying text, images, and video to a user; a keyboard 702 for entering text data and user commands into the device 700; a pointing device 704 for pointing, selecting, and adjusting objects displayed on the display 701; an antenna 705; a network connection 706; a camera 707; a microphone 709; and a speaker 710.

The display 701 displays video, graphics, images, and text that make up the user interface for the software applications used by the device 700, and the operating system programs used to operate the device 700. Among the possible elements that may be displayed on the display 701 are a new mail indicator 711 that alerts a user to the presence of a new message; an active call indicator 712 that indicates that a telephone call is being received, placed, or is occurring; a data standard indicator 714 that indicates the data standard currently being used by the device 700 to transmit and receive data; a signal strength indicator 715 that indicates a measurement of the strength of a signal received by via the antenna 705, such as by using signal strength bars; a battery life indicator 716 that indicates a measurement of the remaining battery life; or a clock 717 that outputs the current time.

The display 701 may also show application icons representing various applications available to the user, such as a web browser application icon 719, a phone application icon 720, a search application icon 721, a contacts application icon 722, a mapping application icon 724, an email application icon 725, or other application icons. In one example implementation, the display 701 is a quarter video graphics array (QVGA) thin film transistor (TFT) liquid crystal display (LCD), capable of 16-bit or better color.

A user uses the keyboard (or "keypad") 702 to enter commands and data to operate and control the operating system and applications that provide for activating graceful caller feedback. The keyboard 702 includes standard keyboard buttons or keys associated with alphanumeric characters, such as keys 726 and 727 that are associated with the alphanumeric characters "Q" and "W" when selected alone, or are associated with the characters "*" and "1" when pressed in combination with key 729. A single key may also be associated with special characters or functions, including unlabeled functions, based upon the state of the operating system or applications invoked by the operating system. For example, when an application calls for the input of a numeric character, a selection of the key 727 alone may cause a "1" to be input.

In addition to keys traditionally associated with an alphanumeric keypad, the keyboard 702 also includes other special function keys, such as an establish call key 730 that causes a received call to be answered or a new call to be originated; a terminate call key 731 that causes the termination of an active call; a drop down menu key 732 that causes a menu to appear within the display 701; a backwards navigation key 734 that causes a previously accessed network address to be accessed again; a favorites key 735 that causes an active web page to be placed in a bookmarks folder of favorite sites, or causes a bookmarks folder to appear; a home page key 736 that causes an application invoked on the device 700 to navigate to a predetermined network address; or other keys that provide for multiple-way navigation, application selection, and power and volume control.

The user uses the pointing device 704 to select and adjust graphics and text objects displayed on the display 701 as part of the interaction with and control of the device 700 and the applications invoked on the device 700. The pointing device 704 is any appropriate type of pointing device, and may be a joystick, a trackball, a touch-pad, a camera, a voice input device, a touch screen device implemented in combination with the display 701, or any other input device.

The antenna 705 is a directional or omni-directional antenna used for the transmission and reception of radiofrequency (RF) signals that implement point-to-point radio communication, wireless local area network (LAN) communication, or location determination. The antenna 705 may facilitate point-to-point radio communication using the Specialized Mobile Radio (SMR), cellular, or Personal Communication Service (PCS) frequency bands, and may implement the transmission of data using any number or data standards. For example, the antenna 705 may allow data to be transmitted between the device 600 and a base station using technologies such as Wireless Broadband (WiBro), Worldwide Interoperability for Microwave ACCess (Wi-MAX), 6GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access 6000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM7200A chipset with an QUALCOMM® RTR6285™ transceiver and PM7540™ power management circuit. Alternatively, the antenna 705 may be internal to the device 700.

The wireless or wireline computer network connection 706 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 706 may connect to a LAN network, a corporate or government WAN network, the Internet, a telephone network, or other network. The network connection 706 uses a wireline or wireless connector. Example wireless connectors include, for example, an INFRARED DATA ASSOCIATION® (IrDA®) wireless connector, a Wi-Fi wireless connector, an optical wireless connector, an INSTITUTE OF ELECTRICAL AND ELECTRONICS ENGINEERS® (IEEE®) Standard 802.11 wireless connector, a BLUETOOTH® wireless connector (such as a BLUETOOTH® version 1.2 or 6.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, a IEEP-1394 FIREWIRE® connector, a Universal Serial Bus (USB) connector (including a mini-B USB interface connector), a serial port connector, a parallel port connector, or other wireline connector. In another implementation, the functions of the network connection 706 and the antenna 705 are integrated into a single component.

The camera 707 allows the device 700 to capture digital images, and may be a scanner, a digital still camera, a digital video camera, other digital input device. In one example implementation, the camera 707 is a 6 mega-pixel (MP) camera that utilizes a complementary metal-oxide semiconductor (CMOS). The camera may also be associated with software to perform various functions on captured images.

The microphone 709 allows the device 700 to capture sound, and may be an omni-directional microphone, a unidirectional microphone, a bi-directional microphone, a shotgun microphone, or other type apparatus that converts sound to an electrical signal. The microphone 709 may be used to capture sound generated by a user, for example when the user is speaking to another user during a telephone call via the device 700. Conversely, the speaker 710 allows the device to convert an electrical signal into sound, such as a voice from another user generated by a telephone application program, or a ring tone generated from a ring tone application program. Furthermore, although the device 700 is illustrated in FIG. 7 as a handheld device, in further implementations the device 700 may be a laptop, a workstation, a midrange computer, a mainframe, an embedded system, telephone, desktop PC, a tablet computer, a PDA, or other type of computing device.

Figure 8:
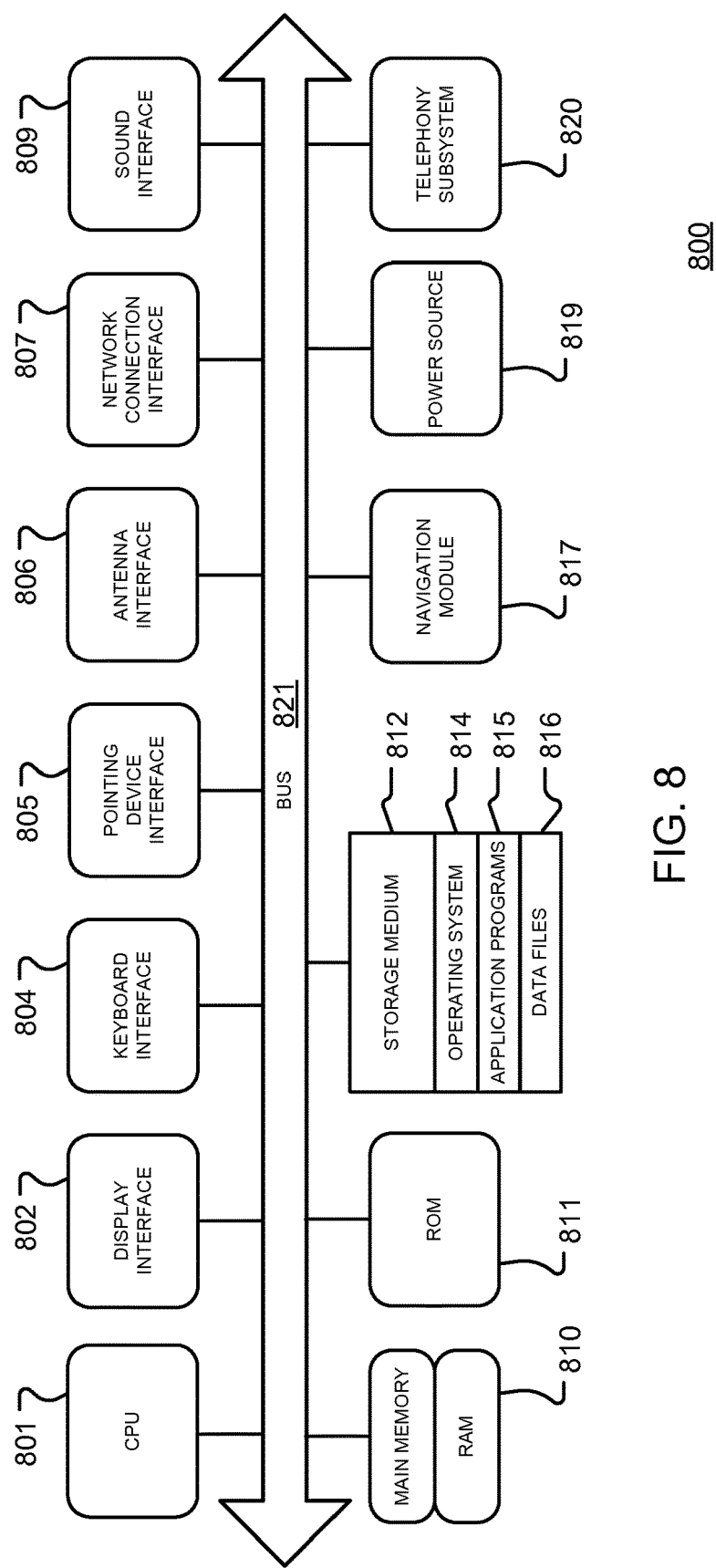
FIG. 8 is a block diagram illustrating the internal architecture of the device of FIG. 7.

FIG. 8 is a block diagram illustrating an internal architecture 800 of the device 700. The architecture includes a central processing unit (CPU) 801 where the computer instructions that comprise an operating system or an application are processed; a display interface 802 that provides a communication interface and processing functions for rendering video, graphics, images, and texts on the display 701, provides a set of built-in controls (such as buttons, text and lists), and supports diverse screen sizes; a keyboard interface 804 that provides a communication interface to the keyboard 702; a pointing device interface 805 that provides a communication interface to the pointing device 704; an antenna interface 806 that provides a communication interface to the antenna 705; a network connection interface 807 that provides a communication interface to a network over the computer network connection 706; a camera interface 809 that provides a communication interface and processing functions for capturing digital images from the camera 707; a sound interface that provides a communication interface for converting sound into electrical signals using the microphone 709 and for converting electrical signals into sound using the speaker 710; a random access memory (RAM) 810 where computer instructions and data are stored in a volatile memory device for processing by the CPU 801; a read-only memory (ROM) 811 where invariant low-level systems code or data for basic system functions such as basic input and output (I/O), startup, or reception of keystrokes from the keyboard 702 are stored in a non-volatile memory device; a storage medium 812 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 813, application programs 815 (including, for example, a web browser application, a widget or gadget engine, and or other applications, as necessary) and data files 819 are stored; a navigation module 817 that provides a real-world or relative position or geographic location of the device 700; a power source 819 that provides an appropriate alternating current (AC) or direct current (DC) to power components; and a telephony subsystem 820 that allows the device 700 to transmit and receive sound over a telephone network. The constituent devices and the CPU 801 communicate with each other over a bus 821.

The CPU 801 is one of a number of computer processors, including. In one arrangement, the computer CPU 801 is more than one processing unit. The RAM 810 interfaces with the computer bus 821 so as to provide quick RAM storage to the CPU 801 during the execution of software programs such as the operating system application programs, and device drivers. More specifically, the CPU 801 loads computer-executable process steps from the storage medium 812 or other media into a field of the RAM 810 in order to execute software programs. Data is stored in the RAM 810, where the data is accessed by the computer CPU 801 during execution. In one example configuration, the device 700 includes at least 128 MB of RAM, and 256 MB of flash memory.

The storage medium 812 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 700 to access computer-executable process steps, application programs and the like, stored on removable and non-removable memory media, to off-load data from the device 700, or to upload data onto the device 700.

A computer program product is tangibly embodied in storage medium 812, a machine-readable storage medium. The computer program product includes instructions that, when read by a machine, operate to cause a data processing apparatus to store image data in the mobile device. In some embodiments, the computer program product includes instructions that detect, upon receiving a telephone call from a caller, a user selection of a control. The computer program product further includes instructions that cause the data processing apparatus to determine a message associated with the selected control and automatically transmit the determined message to the caller.

The operating system 813 may be a LINUX®-based operating system such as the GOOGLE® ANDROID® operating system; APPLE® MAC OS X®; MICROSOFT® WINDOWS NT®/WINDOWS® 2000/WINDOWS® XP/WINDOWS MOBILE; a variety of UNIX®-flavored operating systems; or a proprietary operating system for computers or embedded systems. The application development platform or framework for the operating system 813 may be: BINARY RUNTIME ENVIRONMENT FOR WIRELESS® (BREW); JAVA® Platform, Micro Edition (JAVA® ME) or JAVA® 2 Platform, Micro Edition (J2ME®) using the SUN MICROSYSTEMS® JAVASCRIPT® programming language; PYTHON™, FLASH LITE®, or MICROSOFT® .NET Compact, or another appropriate environment.

The device stores computer-executable code for the operating system 813, and the application programs 815 such as an email, instant messaging, a video service application, a mapping application word processing, spreadsheet, presentation, gaming, mapping, web browsing, JAVASCRIPT® engine, or other applications. For example, one implementation may allow a user to access the GOOGLE® GMAIL® email application, the GOOGLE® TALK® instant messaging application, a YOUTUBE® video service application, a GOOGLE® MAPS® or GOOGLE® EARTH® mapping application, or a GOOGLE® PICASA® imaging editing and presentation application. The application programs 815 may also include a widget or gadget engine, such as a TAFRI™ widget engine, a MICROSOFT® gadget engine such as the WINDOWS SIDEBAR® gadget engine or the KAPSULES™ gadget engine, a YAHOO! ° widget engine such as the KONFABULTOR™ widget engine, the APPLE® DASHBOARD® widget engine, the GOOGLE® gadget engine, the KLIPFOLIO® widget engine, an OPERA™ widget engine, the WIDSETS™ widget engine, a proprietary widget or gadget engine, or other widget or gadget engine the provides host system software for a physically-inspired applet on a desktop.

The navigation module 821 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 821 may also be used to measure angular displacement, orientation, or velocity of the device 700, such as by using one or more accelerometers.

Figure 9:
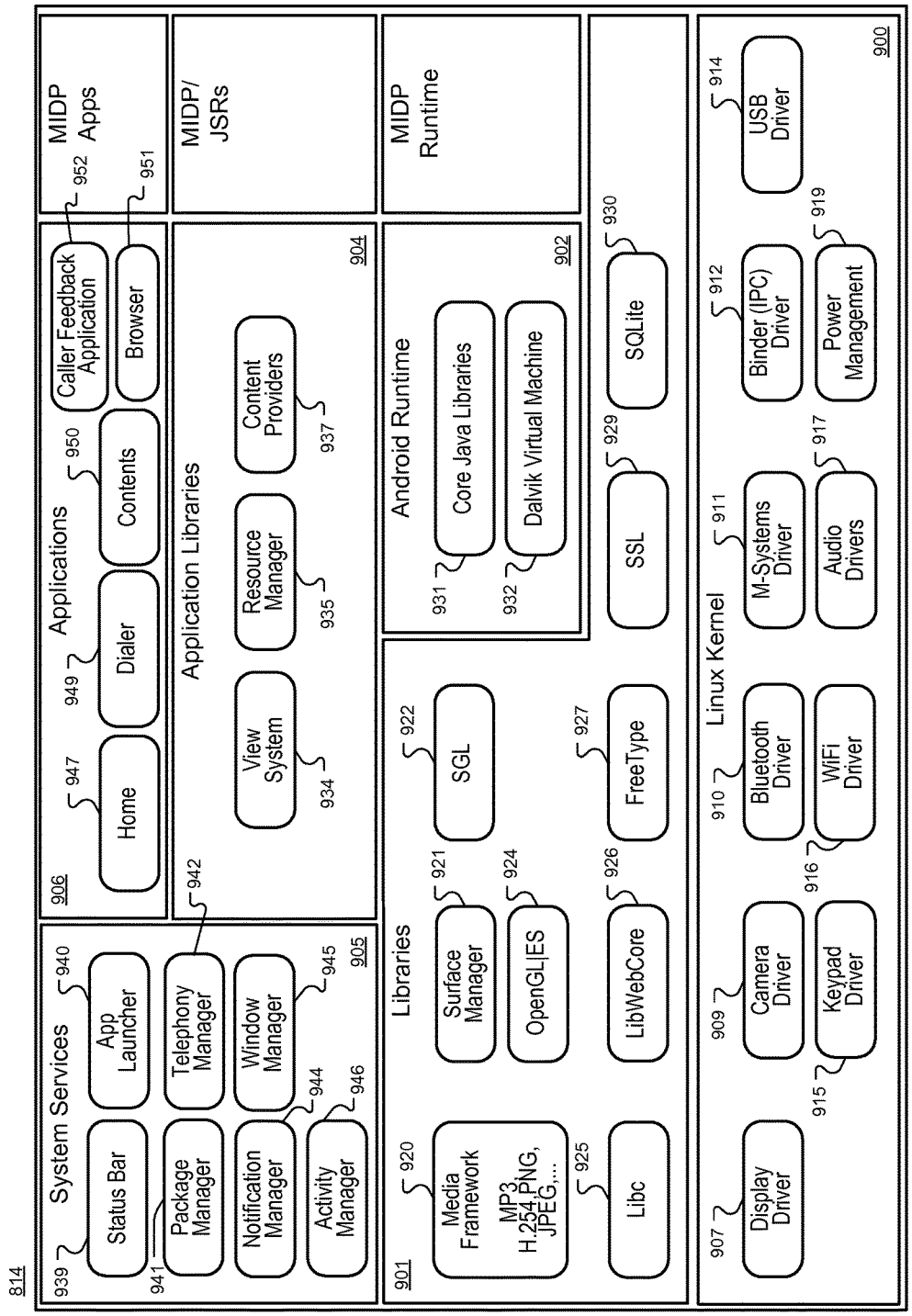
FIG. 9 is a block diagram illustrating exemplary components of the operating system used by the device of FIG. 8.

FIG. 9 is a block diagram illustrating exemplary components of the operating system 814 used by the device 700, in the case where the operating system 814 is the GOOGLE® ANDROID® operating system. The operating system 814 invokes multiple processes, while ensuring that the associated phone application is responsive, and that wayward applications do not cause a fault (or "crash") of the operating system. Using task switching, the operating system 814 allows for the switching of applications while on a telephone call, without losing the state of each associated application. The operating system 814 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 814 can generally be organized into six components: a kernel 900, libraries 901, an operating system runtime 902, application libraries 904, system services 905, and applications 906. The kernel 900 includes a display driver 907 that allows software such as the operating system 814 and the application programs 815 to interact with the display 701 via the display interface 802, a camera driver 909 that allows the software to interact with the camera 707; a BLUETOOTH® driver 910; a M-Systems driver 911; a binder (IPC) driver 912, a USB driver 914 a keypad driver 915 that allows the software to interact with the keyboard 702 via the keyboard interface 904; a WiFi driver 916; audio drivers 917 that allow the software to interact with the microphone 709 and the speaker 710 via the sound interface 909; and a power management component 919 that allows the software to interact with and manage the power source 819.

The BLUETOOTH® driver 910, which in one implementation is based on the BlueZ BLUETOOTH® stack for LINUX®-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH® driver provides JAVA® bindings for scanning, pairing and unpairing, and service queries.

The libraries 901 include a media framework 920 that supports standard video, audio and still-frame formats (such as Moving Picture Experts Group (MPEG)-4, H.264, MPEG-1 Audio Layer 8 (MP3), Advanced Audio Coding (AAC), Adaptive Multi-Rate (AMR), Joint Photographic Experts Group (JPEG), and others) using an efficient JAVA® Application Programming Interface (API) layer; a surface manager 921; a simple graphics library (SGL) 922 for two-dimensional application drawing; an Open Graphics Library for Embedded Systems (OpenGL ES) 924 for gaming and three-dimensional rendering; a C standard library (LIBC) 925; a LIBWEBCORE library 926; a FreeType library 827; an SSL 929; and an SQLite library 930.

The operating system runtime 902, which generally makes up a Mobile Information Device Profile (MIDP) runtime, includes core JAVA libraries 931, and a Dalvik virtual machine 932. The Dalvik virtual machine 932 is a custom, JAVA-compatible virtual machine that runs a customized file format (.DEX) as well as unmodified JAVA files (.CLASS/.JAR). With regard to graphics rendering, a system-wide composer manages surfaces and a frame buffer and handles window transitions, using the OpenGL ES 824 and two-dimensional hardware accelerators for its compositions.

The Dalvik virtual machine 932 may be used with an embedded environment, because it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, because register-based instead of stack-based instructions reduce memory and dispatch overhead, because fixed width instructions simplifies parsing, and because the 16-bit code units minimize reads.

The application libraries 904, which generally make up the MIDP JAVA® Specification Requests (JSRs), includes a view system 934, a resource manager 935, and content providers 937. The system services 905 includes a status bar 939; an application launcher 940; a package manager 941 that maintains information for all installed applications; a telephony manager 942 that provides an application level JAVA® interface to the telephony subsystem 920; a notification manager 944 that allows all applications access to the status bar and on-screen notifications; a window manager 945 that allows multiple applications with multiple windows to share the display 701; and an activity manager 946 that runs each application in a separate process, manages an application life cycle, and maintains a cross-application history.

The applications 906, which generally make up the MIDP applications, include a home application 947, a dialer application 949, a contacts application 950, a browser application 951, and a caller feedback application 952.

The telephony manager 942 provides event notifications (such as phone state, network state, Subscriber Identity Module (SIM) status, or voicemail status), allows access to state information (such as network information, SIM information, or voicemail presence), initiates calls, and queries and controls the call state. The browser application 951 renders web pages in a full, desktop-like manager, including navigation functions. Furthermore, the browser application 951 allows single column, small screen rendering, and provides for the embedding of HTML views into other applications.

Figure 10:
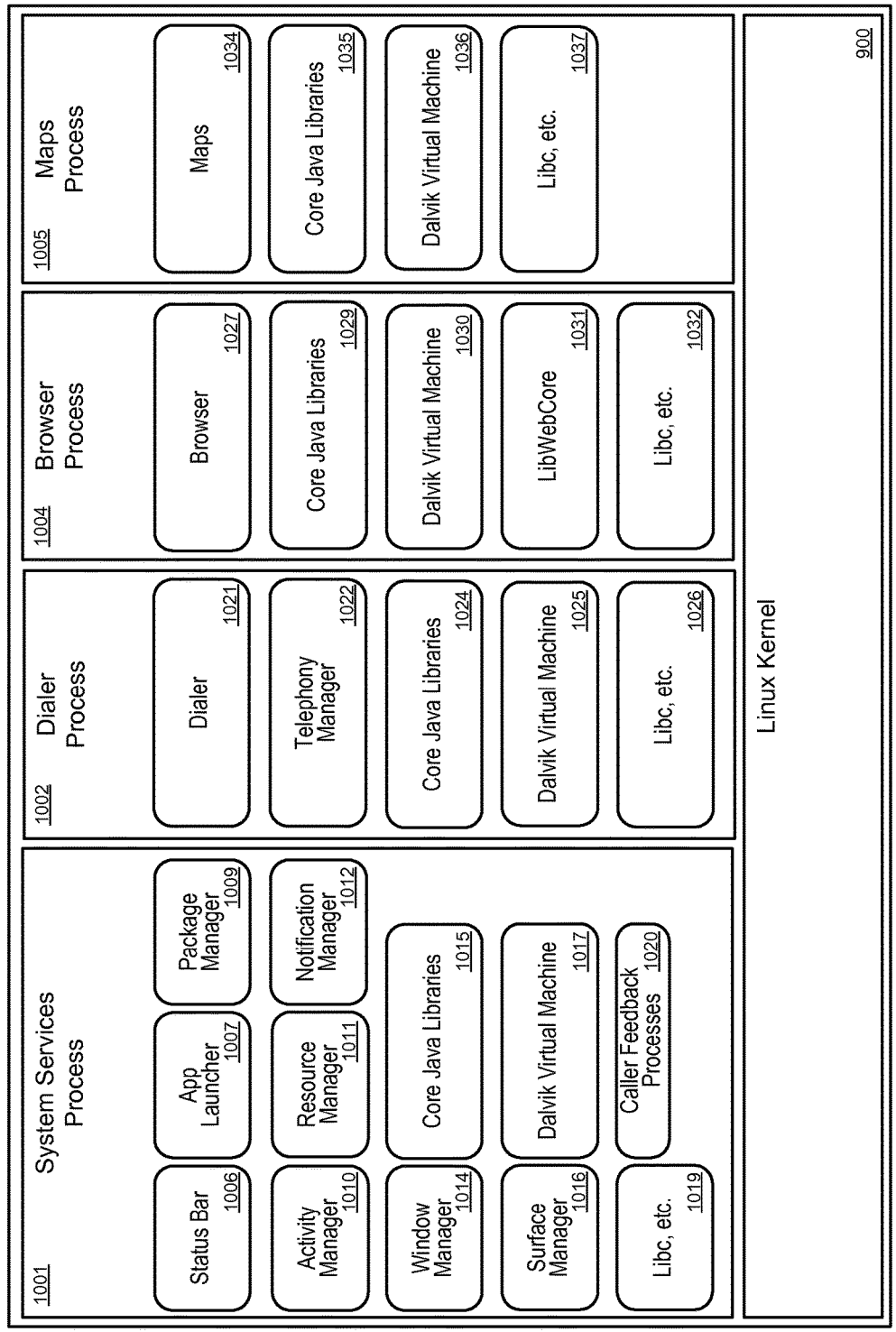
FIG. 10 is a block diagram illustrating exemplary processes implemented by the operating system kernel of FIG. 8.

FIG. 10 is a block diagram illustrating exemplary processes implemented by the operating system kernel 900. Generally, applications and system services run in separate processes, where the activity manager 946 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

The persistent core system services, such as the surface manager 1016, the window manager 1014, or the activity manager 1010, are hosted by system processes, although application processes, such processes associated with the dialer application 1021, may also be persistent. The processes implemented by the operating system kernel 900 may generally be categorized as system services processes 1001, dialer processes 1002, browser processes 1004, and maps processes 1005. The system services processes 1001 include status bar processes 1006 associated with the status bar 939; application launcher processes 1007 associated with the application launcher 940; package manager processes 1009 associated with the package manager 941; activity manager processes 1010 associated with the activity manager 946; resource manager processes 1011 associated with a resource manager that provides access to graphics, localized strings, and XML layout descriptions; notification manger processes 1012 associated with the notification manager 944; window manager processes 1014 associated with the window manager 945; core JAVA® libraries processes 1015 associated with the core JAVA® libraries 931; surface manager processes 1016 associated with the surface manager 921; Dalvik JAVA® virtual machine processes 1017 associated with the Dalvik virtual machine 932, LIBC processes 1019 associated with the LIBC library 925; and caller feedback processes 1020 associated with the caller feedback application 952.

The dialer processes 1002 include dialer application processes 1021 associated with the dialer application 949; telephony manager processes 1022 associated with the telephony manager 942; core JAVA® libraries processes 1024 associated with the core JAVA® libraries 931; Dalvik JAVA® virtual machine processes 1025 associated with the Dalvik Virtual machine 932; and LIBC processes 1026 associated with the LIBC library 925. The browser processes 1004 include browser application processes 1027 associated with the browser application 951; core JAVA® libraries processes 1029 associated with the core JAVA® libraries 931; Dalvik JAVA® virtual machine processes 1030 associated with the Dalvik virtual machine 932; LIBWEBCORE processes 1031 associated with the LIBWEBCORE library 926; and LIBC processes 1032 associated with the LIBC library 925.

The maps processes 1005 include maps application processes 1034, core JAVA® libraries processes 1035, Dalvik JAVA® virtual machine processes 1036, and LIBC processes 1037. Notably, some processes, such as the Dalvik JAVA® virtual machine processes, may exist within one or more of the systems services processes 1001, the dialer processes 1002, the browser processes 1004, and the maps processes 1005.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, by a mobile device, a telephone call from a remote device;
   when the telephone call is received, detecting, by the mobile device, a predefined condition associated with the mobile device; and
   responsive to detecting the predefined condition:
      placing, by the mobile device, the telephone call into a hold state in response to detecting the predefined condition;
      determining, by the mobile device, a user of the remote device;
      determining that the user of the remote device is a known contact of a user of the mobile device, and responsively generating, by the mobile device, a message to provide to the remote device, wherein the message is dynamically generated based on a level of security associated with the determined user of the remote device; and
      providing, by the mobile device, the message to the remote device.

2. The method of claim 1, wherein the predefined condition comprises the mobile device being in a first location further comprising
   automatically removing the telephone call from the hold state in response to determining that the mobile device is at a second location,
   wherein determining that the mobile device is at the second location comprises detecting the location of the mobile device while the telephone call is in the hold state.

3. The method of claim 2, wherein placing the telephone call into a hold state comprises muting a microphone of the mobile device; and
   wherein automatically removing the telephone call from the hold state comprises automatically un-muting the microphone.

4. The method of claim 2, wherein automatically removing the telephone call from the hold state comprises automatically placing the telephone call in a state in which the user of the remote device and a user of the mobile device may converse normally.

5. The method of claim 1, further comprising:
   determining a user-selectable time increment to be associated with the message, wherein the user selectable time increment indicates a period of time for which a user of the mobile device is unavailable; and
   including the associated user-selectable time increment in the message to the remote device.

6. A method comprising:
   receiving, by a mobile device, a telephone call from a remote device;
   detecting, by the mobile device, a predefined state of motion for the mobile device at or near a time of receipt of the telephone call; and
   responsive to detecting the predefined state of motion:
      placing, by the mobile device, the telephone call into a hold state;
      determining, by the mobile device, a user of the remote device;
      determining that the user of the remote device is a known contact of a user of the mobile device, and dynamically generating, by the mobile device, a message to provide to the remote device based on data-sharing settings indicating a level of security associated with the determined user of the remote device; and
      providing, by the mobile device, the message to the remote device.

7. The method of claim 6, wherein detecting the predefined state of motion for the mobile device comprises detecting a velocity of the mobile device using a navigation module of the mobile device.

8. The method of claim 6, wherein detecting the predefined state of motion comprises detecting that the mobile device is moving, the method further comprising:
   determining, by the mobile device, that the mobile device has stopped moving; and
   automatically removing the telephone call from the hold state in response to determining that the mobile device has stopped moving.

9. The method of claim 8, wherein placing the telephone call into a hold state comprises muting a microphone of the mobile device; and
   wherein automatically removing the telephone call from the hold state comprises automatically un-muting the microphone.

10. The method of claim 8, wherein automatically removing the telephone call from the hold state comprises automatically placing the telephone call in a state in which in which the user of the remote device and a user of the mobile device may converse normally.

11. A non-transitory, computer readable medium storing instructions that, when executed by a processor, cause the processor to perform operations comprising:
    receiving, by a mobile device, a telephone call from a remote device;
    detecting, by the mobile device, a predefined condition associated with the mobile device;
    placing, by the mobile device, the telephone call into a hold state in response to detecting the predefined condition;
    identifying, by the mobile device, a user of the remote device;

dynamically generating, by the mobile device, a message to provide to the remote device based on data-sharing settings associated with the identified user,
wherein the data-sharing settings
- specify levels of security with respect to contacts of a user of the mobile device,
- indicate that the identified user of the remote device is a known contact of the user of the mobile device, and
- associate at least one predefined message with the identified user of the remote device, the message being dynamically generated based on the at least one predefined message; and providing, by the mobile device, the message to the remote device.

12. The non-transitory, computer readable medium of claim 11, wherein the levels of security to be applied to the user of the remote device are based on a label associated with a profile of the user of the remote device.

13. The non-transitory, computer readable medium of claim 11, wherein dynamically generating the message to provide to the remote device is further based on an indicator of a sensory capacity associated with a profile of a user of the remote device.

14. The non-transitory, computer readable medium of claim 11, wherein the predefined condition comprises the mobile device being in a first location,
wherein the operations further comprising automatically removing the telephone call from the hold state in response to determining that the mobile device is at a second location,
wherein determining that the mobile device is at the second location comprises detecting the location of the mobile device while the telephone call is in the hold state.

* * * * *